April 21, 1953 D. G. ISHAM ET AL 2,635,923
ROLLER SKATE WHEEL
Filed Aug. 15, 1950
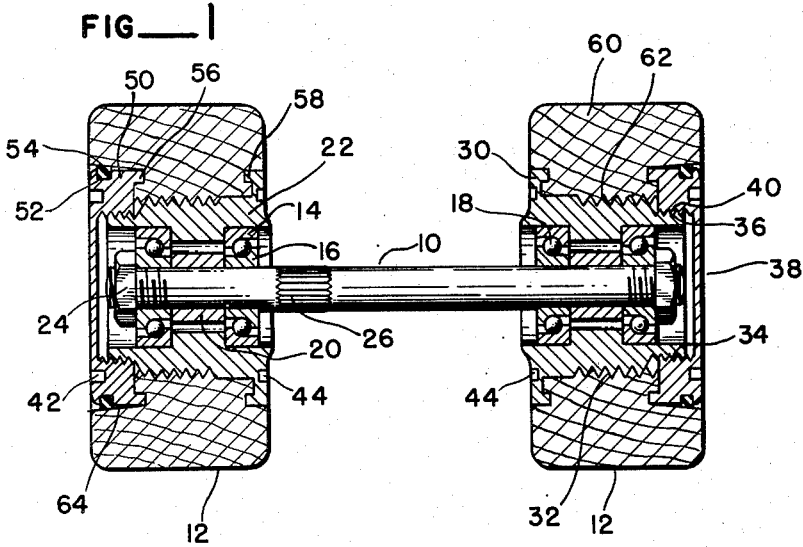
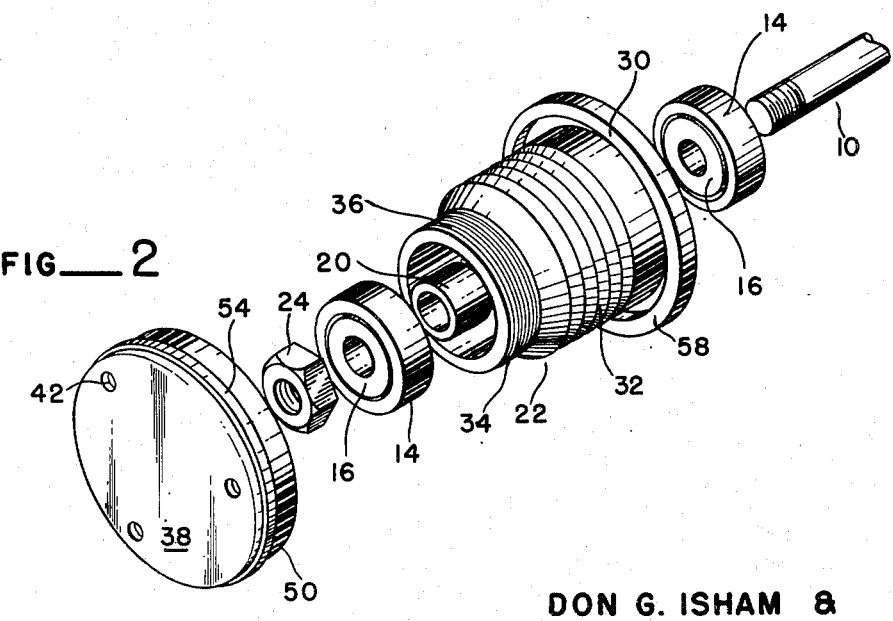
DON G. ISHAM &
DONALD A. PELTIER
Inventor
By Smith & Tuck
Attorneys Patented Apr. 21, 1953

2,635,923

UNITED STATES PATENT OFFICE 2,635,923

ROLLER SKATE WHEEL

Don G. Isham and Donald A. Peltier,
Seattle, Wash.

Application August 15, 1950, Serial No. 179,486

2 Claims. (Cl. 301—5.7)

Our invention pertains to wheels and bearings therefor, and, more particularly to a roller skate wheel. The hub of each wheel has an outstanding annular flange at one end, external screw threads on the hub adjacent the flange and medial of the hub, and a necked portion at the other end with external threads of a greater number of threads per inch than the medial threads. A cap nut is provided which is threaded to match the threads of said necked portion and carries an annular rim which includes an outstanding resilient ring. The wooden tire has internal threads to fit the medial threads on said hub and is counterbored on either side to receive said annular flange and said annular rim, the resilient ring bearing on the tire to resist relative movement between the two. This construction provides means of holding the tire securely on the hub.

Roller skate wheels have, generally, a common fault in that the hub members, extending to either side of the tire, have a tendency to unthread one from another during use. This permits lateral movement of the tire on the hub with attendant wear of the tire, danger of the wheel coming apart during use, and lack of stability of the skate for accurate and smooth skating by the user.

It is an object of our invention, therefore, to provide means for locking the two portions of the hub together to insure against relative movement therebetween, thereby guarding against accidents, preventing movement of the tire on the hub so as to avoid wear, and providing a stable wheel for a roller skate. Further objects include to secure the tire of the roller skate firmly on its hub, to provide means for quickly and easily removing tires from their bearings and to supply an economical wheel of sound construction for roller skates.

Our invention will best be understood from the following description when read with reference to the drawings, in which:

Figure 1 is a view, partly in section, taken in a plane running through the axes of a pair of wheels, embodying the features of our invention; and Figure 2 is a perspective view, in exploded form, of the parts of the hub assembly.

Referring to Figure 1, shaft 10 connects paired wheels 12 and runs through the shaft bearing of the skate body, not shown. On each end of shaft 10 is disposed a pair of ball bearing assemblies, each having outer race 14 and inner race 16 between which are positioned balls 18. Spacers 20 separate the two sets of races on each wheel. Hub 22 is counterbored at either end to form seats for outer races 18. Shaft 10 is threaded at either end and nuts 24 are disposed on the threaded ends. Spline 26 on shaft 10 is positioned in the shaft housing in the roller skate body, not shown, to prevent movement of shaft 26 with relation to the roller skate body. Nut 24 forcing inner races 16 and spacer 20 together and against the outer surfaces of the shaft housing of the roller skate body, positions these parts on shaft 10. Balls 18 being interposed between the races, there is no tendency for nut 24, inner races 16 and spacer 20 to move relative shaft 10.

Hub 22 has an outstanding annular flange 30 on its inner end. Adjacent flange 30 and medial of the hub are external threads 32. The outer end of hub 22 is necked, as at 34, and has external threads 36 of a greater number of threads per inch than threads 32. Cap nut 38 has internal threads 40 to fit threads 22 and secure cap nut 38 on the necked end of hub 22. Cap nut 38 and hub 22 have a plurality of recesses 42, 44 in their outer surfaces to accommodate the prongs of a spanner wrench for relative rotation of these parts to tighten the same.

Cap nut 38 has an annular rim 50 with an annular recess 52 in which is positioned resilient ring 54. Annular rim 50 and outstanding flange 30 carry opposed, inwardly directed, annular flanges, 56 and 58 respectively.

Wooden tire 60 has internal threads 62 to fit threads 32 medial of hub 22. Tire 60 is counterbored at either end to accommodate annular rim 50 and flange 56, and outstanding flange 30 and flange 58. The counterbores are cylindrical, except for the counterbore at 64 which is preferably frusto-conical to accommodate resilient ring 54 which is outstanding from annular rim 50. With the frusto-conical shape, resilient ring 54 is gradually compressed as cap nut 38 and hub 22 approach each other. One purpose of ring 54 is to act as a dust seal to prevent fouling of the bearing. The other purpose of resilient ring 54 is to resist movement between tire 60 and cap nut 38.

When the tire 60 and the cap nut 38 are tightened together they act like double nuts on a bolt, exerting pressure on the threads thereby resisting rotation. Cap nut 38 and tire 60 having internal threads of different threads per inch, tire 60 tends to move laterally a greater distance at each rotation than cap nut 38 and any mutual rotation places greater stress on the threads on hub 22 and further resists rotation. Ring 54 tends to prevent rotation of cap nut 38 independent of tire 60. Together these various deterrents to rotation insure that tire 60 will not move relative hub 22. This is an important achievement as any relative movement of these parts renders the skate less stable and is dangerous; and, of course, if tire 60 comes completely off a serious accident may happen. For accurate and smooth skating it is important that the tire be secured in position; and increased wear on the various parts occurs if the wheel becomes unbalanced by lateral movement of the wheel.

The common method of securing a wooden skate tire to its hub is to use force, a very close tolerance being provided. There is attendant difficulty in joining and separating the wheel and the hub. With the present method, tire 60 is screwed on and off hub 22. The adjacent non-threaded surfaces do not have to have very close tolerances; but, if such a tolerance is used or there is a swelling in the wood, the threads provide means for removal of the tire by mere relative rotation between the tire and the hub. Flanges 56, 58 provide additional means for holding tire 60 in place and tend to hold the tire together in case of splitting the wood, protecting the skater from suddenly and completely losing the tire.

Having thus described a specific embodiment of our invention, it will be apparent to those skilled in the art that various modifications may be made in the depicted structure; and we wish to be understood as not limiting ourselves to the structure described but wish to claim all modifications within the fair scope of our invention.

We claim:

1. In a skate wheel structure of the type wherein there is a shaft having a free-rolling metal bushing hub thereon to which is secured a wooden tire to revolve with said hub; tire and hub joinder means characterized by: said bushing hub having at one end an outstanding annular flange; said hub having external medial screw threads adjacent said flange and medial of said hub; said hub having a necked portion on its end opposite said flange and adjacent said medial threads, said necked portion having external threads of a greater number of threads per inch than that of said medial threads; said wooden tire having an axial bore having internal threads matching said medial threads and positioned thereon, said wooden tire being counterbored at either end adjacent said axial bore, the end wall of a first of said counterbores at a first end of said tire abutting said annular flange; a cap nut having internal threads matching said external threads of said necked portion and positioned thereon; said cap nut having an annular rim having an annular groove therein; a resilient ring positioned in said groove, said cap nut having an inner surface, a portion of the inner surface of said cap nut abutting the end wall of the second counterbore of said tire and said resilient ring frictionally engaging the adjacent wall surface of said second counterbore.

2. In a skate wheel structure of the type wherein there is a shaft having a free-rolling metal bushing hub thereon to which is secured a wooden tire to revolve with said hub; tire and hub joinder means characterized by: said bushing hub having at one end an outstanding annular flange; said hub having external medial screw threads adjacent said flange and medial of said hub; said hub having a necked portion of its end opposite said flange and adjacent said medial threads, said necked portion having external threads of a greater number of threads per inch than that of said medial threads; said wooden tire having an axial bore having internal threads matching said medial threads and positioned thereon, said wooden tire being counterbored at either end adjacent said axial bore, the end wall of a first of said counterbores at a first end of said tire abutting said annular flange; a cap nut having internal threads matching said external threads of said necked portion and positioned thereon; said cap nut having an annular rim and an outstanding resilient ring on said rim, said cap nut having an inner surface, a portion of the inner surface of said cap nut abutting the end wall of the second counterbore of said tire, said second counterbore having a frusto-conical form flaring from the inside to the outside thereof and said resilient ring frictionally engaging the frusto-conical wall of said second counterbore; said annular flange and said cap nut each having a flange axially directed and facing each other and said end walls of said counterbores having grooves in which said axially directed flanges are positioned.

DON G. ISHAM.
DONALD A. PELTIER.

References Cited in the file of this patent

UNITED STATES PATENTS

| Number | Name | Date |
|---|---|---|
| 1,033,271 | Robinson | July 23, 1912 |
| 1,063,790 | Greaves | June 3, 1913 |
| 1,247,991 | Ney | Nov. 27, 1917 |
| 2,110,825 | Archer | Mar. 8, 1938 |
| 2,463,378 | Hallerstrom | Mar. 1, 1949 |

FOREIGN PATENTS

| Number | Country | Date |
|---|---|---|
| 6,752 | Great Britain | 1914 |
| 449,156 | France | Feb. 19, 1913 |